Patented Aug. 29, 1939

2,171,439

UNITED STATES PATENT OFFICE 2,171,439

PROCESS FOR THE PRODUCTION OF REGULINE BERYLLIUM AND BERYLLIUM ALLOYS

Helmut von Zeppelin, Bitterfeld, Germany, assignor to I. G. Farbenindustrie Aktiengesellschaft, Frankfort-on-the-Main, Germany No Drawing. Application November 13, 1937, Serial No. 174,351

13 Claims. (Cl. 75—84)

This invention relates to a process for the production of reguline beryllium and beryllium alloys and is a continuation in part of my application Serial No. 148,758, filed June 17, 1937, and entitled Process for the production of reguline beryllium.

Attempts to develop into a commercial process, the classic laboratory method of producing beryllium by reducing beryllium chloride with sodium, have so far failed owing to inherent technical difficulties. According to the more recent proposals it is more advantageous to substitute magnesium for sodium as the reducing agent and to add beryllium fluoride or complex alkali-beryllium fluorides (such as $KBeF_3$) to the beryllium chloride. The procedure consists in first gradually adding a melt of the said saline mixture to a larger quantity of molten magnesium while operating in an inert atmosphere and by agitating the melt, causing the decomposition to proceed, at a temperature below the melting point of beryllium, the heat of reaction being sufficient to maintain the reaction. Immediately after the termination of the reaction, the temperature is raised above the melting point of beryllium, so that the separated particles of beryllium coalesce to a regulus beneath the slag which consists of a mixture of magnesium chloride and magnesium fluoride, the potassium, whenever $KBeF_3$ is employed, being volatilised.

In view of the fact that the employment of beryllium fluorides for the production of beryllium is accompanied with the evolution of most obnoxious fluorine fumes and further that according to the aforedescribed methods it is impossible to recover more than 50% of the beryllium contained in the starting material, in the metallic form, attempts were also made to employ beryllium chloride as the starting material. When working in this manner the beryllium chloride, if desired after admixture of other saline compounds, was first fused and the reducing agent, such as magnesium was introduced into the fused product. These attempts, however, have hitherto proved unsuccessful, since, owing to the low volatilisation temperature of beryllium chloride, the losses of the latter substance occurring in the reduction, are too excessive for economic production.

It has now transpired, as a result of experiments, that the evaporation of beryllium chloride occurring in the known process, in which the magnesium is introduced into a saline melt already containing beryllium chloride, is due mainly to the fact that the magnesium, which is usually employed in the form of chips or turnings, becomes partly ignited and the very high temperatures locally generated by such ignition cause a substantial evaporation of beryllium chloride.

According to the present invention such local ignition of the magnesium employed as the reducing agent is avoided to a substantial degree by heating a preformed mixture of beryllium chloride and magnesium, preferably in pulverulent form or in the form of a compressed body, to suitable reaction temperatures, ranging preferably between about 730 to 900° C. When working in this manner, the beryllium chloride present in the mixture fuses first by virtue of its lower melting point, and envelops the initially still unfused magnesium particles, thus protecting them from ignition. On further heating, the magnesium particles also become melted and react with the surrounding beryllium chloride without local ignition so that substantial evaporation of beryllium chloride is avoided.

According to one embodiment of the invention, a pulverulent or pre-compressed mixture of beryllium chloride and magnesium (in a not too finely divided state and preferably in the form of turnings) is gradually introduced into a fused residue from a previous operation, consisting substantially of magnesium chloride and maintained at the reaction temperature, e. g., from 800° to 1000° C., the reaction being carried out in a closed vessel fitted with stirrers and lock chambers. It is possible to operate with a mean temperature of about 900° C. for the melt, and thus not very much above the melting point of magnesium chloride (which, as previously stated, forms the main constituent of the melt) and thereby to separate the metallic beryllium in the form of coarsely crystalline flakes. When the desired amount of originating material has been supplied, the melt is left to cool in the crucible. During cooling the melt separates into an outer saline portion consisting almost entirely of magnesium chloride and into an inner portion consisting of beryllium flakes interspersed with magnesium chloride.

According to another embodiment of the invention, the reaction mixture is simply placed in an empty crucible, and heated therein to the required temperature.

It has been found that the process of the present invention may be carried out in a reaction vessel of any suitable shape, e. g., in an open crucible. The provision of an atmosphere of hydrogen or other inert gas, although by no means necessary, is nevertheless advantageous;

this may be effected by passing hydrogen over the reaction mixture during the reaction. The evaporation of beryllium chloride is still further reduced by operating in a closed vessel, which may, if desired, be provided with a stirrer, and in an atmosphere of hydrogen of a pressure somewhat higher than atmospheric.

The reaction of the mixture of beryllium chloride and magnesium, which are preferably employed in stoichiometric proportions, proceeds smoothly and rapidly within the temperature range of between 730 and 900° C. so that the reaction is usually completed after a few minutes only, a duration of about 15 minutes being on the exceptional side. It may, however, be advantageous to employ a small excess of magnesium, e. g., about 0.5% by weight over the quantity stoichiometrically required.

If desired, the reaction temperature may be further lowered down to the melting point of magnesium by adding chlorides, such as potassium chloride, sodium chloride, magnesium chloride and the like, in quantities up to about 20% of the reaction mixture, which also causes a lowering of the melting point of the saline reaction residue containing the magnesium chloride formed during the reaction. When exceeding a limit of about 20% of these additions, the reaction temperature falls below the melting point of magnesium and under such conditions the resulting flakes of metallic beryllium become very small and assume a more graphitic form, and when in such form render the removal of any oxide adhering thereto extremely difficult.

The resulting product may be worked up in various ways. Thus, the inner portion of the reaction product containing substantially all the beryllium, may be removed, and washed with water or, preferably with a solution of ammonium chloride whereupon the small amount of magnesium contained in the beryllium is almost completely dissolved, leaving behind the beryllium.

A more efficient method of separating the saline melt from the solid beryllium metal, however consists in separating the mass of interlaced metal flakes, having the appearance of a sintered compact body, from the saline melt immediately after completion of the reaction, e. g. by lifting it out of said melt or by decanting the bulk of the saline melt, and subsequently removing the residual salt melt by compressing the separated body or mass of beryllium flakes between two perforated plates. In this manner, substantially the whole of the metallic beryllium obtained by reduction is retained between the plates, the beryllium particles having the shape of small flakes not passing through the perforations of the plates. The same result may be obtained by applying a piston provided with a perforated bottom to the reaction mixture, while still in the crucible. In this manner it is possible to produce a briquetted mass of crystalline beryllium from the starting mixture, in a single-stage process (i. e., without repeated heating).

Unless saline compounds lowering the melting point of magnesium chloride have already been added prior to the reaction, it is preferable to add such compounds at this stage, so as to lower the viscosity of the saline melt and enable a more complete separation of the crystalline mass of metallic beryllium from the melt to be brought about with more simply mechanical means and at lower temperatures.

The provision of an inert atmosphere is also advantageous in carrying out the separation of the metallic beryllium from the saline melt.

The resulting beryllium flakes are then briquetted under heavy pressure and are melted, in vacuo, by heating in a crucible lined with beryllium oxide, or other substances inert towards beryllium, the temperature being raised to about 1400° C. and the heating continued in a current of argon or hydrogen, for the further purification of the beryllium. Whereas, under these conditions, the beryllium flakes fuse to a regulus of a purity of about 98%, the beryllium oxide remains as a powder on the surface of the regulus and, after removal from the metal, can be reconverted into beryllium chloride, by the action of carbon and chlorine, in accordance with known methods.

*Example*

A mixture consisting of 393 parts by weight of beryllium chloride in pulverulent form and 120 parts by weight of magnesium in the form of fine granules is heated to 800° C. in a crucible disposed in a closed pressure-tight vessel filled with hydrogen, the excess pressure arising during the heating being released from time to time. The reaction is completed after about 10 minutes, the products of reaction totalling 497 parts by weight, thus showing that the losses due to evaporation amount to only about 3%. The crystalline beryllium in the shape of a compact body of interlaced metal flakes is then lifted out of the still fused melt of magnesium chloride and the latter decanted.

Said body is then again deposited in the crucible and compressed at about 800° C. by means of a piston having a perforated bottom. The magnesium chloride removed in this manner is practically free from beryllium. The compressed body of beryllium is then converted into reguline beryllium by melting it at 1400° C. in an atmosphere of argon.

When it is desired to obtain instead of pure beryllium, a beryllium alloy, such as a copper beryllium alloy, it is merely necessary to incorporate in the reaction mixture the desired quantities, preferably in finely divided form, of the metal to be alloyed with the beryllium. Whenever the formation temperatures of the desired alloy are higher than the desired reaction temperatures, the metallic mixture obtained should be subsequently heated to the temperatures required for the formation of the alloy.

According to a known process alloys of heavy metals containing beryllium are produced by introducing a mixture of a reducible beryllium compound, which may, e. g., be beryllium chloride, and magnesium into the molten heavy metal. The present process, irrespective of whether the mixture of magnesium and beryllium chloride is directly treated in a crucible or whether it is heated in a saline melt within such crucible, is distinguished from such earlier processes in that the heat supplied to the reaction mixture in order to cause reaction is, in the present case, transmitted by means of a medium (viz., the crucible or the molten saline mixture) which is inert with respect to beryllium, the term "inert", as here used as well as in the appended claims, meaning to exclude also the formation of an alloy of beryllium with the heat-transmitting medium. The particular advantage of the present process over that above referred to consists in that the temperature of the reaction mixture is by transmission of heat progressively and somewhat gradually raised to the reaction temperature and beyond, whereas, when a molten heavy metal is contacted with such reaction mixture then, because of the high temperature of such metal melt and its good heat conductivity, the reaction mixture becomes rapidly heated to temperatures well above the reaction temperature, with consequent volatilisation of the beryllium chloride and/or ignition of the magnesium employed as the reducing agent.

I claim:

1. A process of producing beryllium metal which comprises heating an intimate solid mixture comprising beryllium chloride and magnesium in reactive proportions to temperatures sufficient to cause reaction of such mixture by a supply of heat transmitted from a medium inert with respect to metallic beryllium, and separating metallic beryllium from the saline residue.

2. A process of producing beryllium metal which comprises heating a briquetted intimate mixture comprising beryllium chloride and magnesium in reactive proportions to temperatures sufficient to cause reaction of such mixture by a supply of heat transmitted from a medium inert with respect to metallic beryllium, and separating metallic beryllium from the saline residue.

3. A process of producing beryllium metal which comprises introducing an intimate solid mixture of beryllium chloride and magnesium in reactive proportions into a saline melt comprising magnesium chloride, while maintaining such melt at temperatures sufficient to cause reaction of such mixture, and separating metallic beryllium from the saline residue.

4. A process of producing beryllium metal which comprises introducing a briquetted intimate mixture of beryllium chloride and magnesium in reactive proportions into a saline melt comprising magnesium chloride, while maintaining such melt at temperatures sufficient to cause reaction of such mixture, and separating metallic beryllium from the saline residue.

5. A process of producing beryllium metal which comprises introducing an intimate solid mixture of beryllium chloride and magnesium in reactive proportions into a saline melt obtained from a previous operation and consisting substantially of magnesium chloride, while maintaining such melt at temperatures sufficient to cause reaction of such mixture, and separating metallic beryllium from the saline residue.

6. A process of producing beryllium metal which comprises heating an intimate solid mixture of beryllium chloride and magnesium in reactive proportions in an atmosphere of inert gas to temperatures sufficient to cause reaction of such mixture by a supply of heat transmitted from a medium inert with respect to metallic beryllium, and separating metallic beryllium from the saline residue.

7. A process of producing beryllium metal which comprises introducing an intimate solid mixture of beryllium chloride and magnesium in reactive proportions, in an atmosphere of inert gas, into a saline melt comprising magnesium chloride, subjecting such melt to temperatures sufficient to cause reaction of such mixture, and separating metallic beryllium from the saline residue.

8. A process of producing beryllium metal which comprises introducing a briquetted intimate mixture of beryllium chloride and magnesium in reactive proportions, in an atmosphere of inert gas, into a saline melt comprising magnesium chloride, subjecting such melt to temperatures sufficient to cause reaction of such mixture, and separating metallic beryllium from the saline residue.

9. A process of producing beryllium metal which comprises heating an intimate solid mixture consisting of beryllium chloride and at least one other chloride of the group consisting of the alkali and alkaline earth metals, and magnesium to temperatures sufficient to cause reaction of such mixture by a supply of heat transmitted from a medium inert with respect to metallic beryllium, magnesium and beryllium chloride being present in reactive proportions and the total quantity of such other chlorides not exceeding about 20% of the reacting mixture proper, and separating metallic beryllium from the saline residue of the reaction.

10. A process of producing beryllium metal which comprises heating a briquetted intimate mixture consisting of beryllium chloride and at least one other chloride of the group consisting of the alkali and alkaline earth metals, and magnesium to temperatures sufficient to cause reaction of such mixture, magnesium and beryllium chloride being present in reactive proportions and the total quantity of such other chlorides not exceeding about 20% of the reacting mixture proper, and separating metallic beryllium from the saline residue of the reaction.

11. A process of producing a beryllium alloy which comprises heating an intimate solid mixture of beryllium chloride and magnesium in reactive proportions, and of the metal to be alloyed with the beryllium, to temperatures sufficient to cause reaction of such mixture and formation of a beryllium alloy and separating the resulting alloy from the saline residue of the reaction.

12. A process of producing beryllium metal which comprises heating an intimate mixture solid of beryllium chloride and magnesium in reactive proportions to temperatures sufficient to cause reaction of such mixture, separating the body of interlaced flakes of metallic beryllium, resulting from the reaction, from the bulk of the saline reaction residue, and subsequently subjecting such body to compression while maintaining temperatures in excess of the fusion point of the saline reaction residue so as to remove said residue from said metallic body.

13. A process of producing beryllium metal which comprises heating an intimate solid mixture of beryllium chloride and magnesium in reactive proportions to temperatures sufficient to cause reaction of such mixture, separating the body of interlaced flakes of metallic beryllium, resulting from the reaction, from the bulk of the saline reaction residue, subsequently subjecting such body to compression while maintaining temperatures in excess of the fusion point of the saline reaction residue so as to remove said residue from said metallic body, and finally subjecting said metallic body in a current of hydrogen to temperatures adapted to cause coalescence of the metallic particles forming said body.

HELMUT VON ZEPPELIN.